(12) United States Patent
Cheng

(10) Patent No.: US 6,636,210 B1
(45) Date of Patent: Oct. 21, 2003

(54) METHOD AND SYSTEM FOR AUTO-NAVIGATION IN A THREE DIMENSIONAL VIEWING ENVIRONMENT

(75) Inventor: Gavin Cheng, San Francisco, CA (US)

(73) Assignee: Muse Corporation, Milbrae, CA (US)

( * ) Notice: Subject to any disclaimer, the term of this patent is extended or adjusted under 35 U.S.C. 154(b) by 0 days.

(21) Appl. No.: 09/561,950

(22) Filed: May 1, 2000

Related U.S. Application Data

(63) Continuation-in-part of application No. 09/518,552, filed on Mar. 3, 2000.

(51) Int. Cl.$^7$ ................................................ G06T 15/00
(52) U.S. Cl. ...................................... 345/419; 345/850
(58) Field of Search ................................ 345/419, 358, 345/473, 333, 355, 850, 863, 856

(56) References Cited

U.S. PATENT DOCUMENTS

| | | | | |
|---|---|---|---|---|
| 5,754,189 A | * | 5/1998 | Doi et al. ................... | 345/473 |
| 5,808,613 A | * | 9/1998 | Marrin et al. ............... | 345/850 |
| 5,907,328 A | * | 5/1999 | Brush, II et al. ........... | 345/358 |
| 6,023,270 A | * | 2/2000 | Brush, II et al. ........... | 345/333 |
| 6,052,123 A | * | 4/2000 | Lection et al. ............. | 345/419 |
| 6,226,655 B1 | * | 5/2001 | Borman et al. ............. | 707/501 |
| 6,271,843 B1 | * | 8/2001 | Lection et al. ............. | 345/355 |
| 6,346,938 B1 | * | 2/2002 | Chan et al. ................. | 345/419 |

* cited by examiner

*Primary Examiner*—Mark Zimmerman
*Assistant Examiner*—Huedung X. Cao
(74) *Attorney, Agent, or Firm*—Joe Zheng; Roger Chu

(57) ABSTRACT

A method for use in a three dimensional browsing environment is described. The method, in one embodiment, includes receiving a jump request from one viewing point to another. The method also includes determining a destination from the current viewing point with respect to the jump request. The method further includes calculating a trajectory to the destination from the current viewing point. The method stills includes displaying a set of views in animation form along the trajectory and displaying a view corresponding to the destination.

14 Claims, 11 Drawing Sheets

| Domain names | Number of hits |
|---|---|
| www.yhool.com | 26744 |
| www.msn.com | 234 |
| ... | ... |

*Fig. 4*

METHOD AND SYSTEM FOR AUTO-NAVIGATION IN A THREE DIMENSIONAL VIEWING ENVIRONMENT

CROSS-REFERENCE TO RELATED APPLICATIONS

This application is related to pending U.S. patent applications No.: 60/096,884 and Ser. No. 09/375,476, filed respectively on Aug. 17, 1998 and Aug. 16, 1999, each of which is assigned to the same assignee as the present application and are hereby incorporated by reference. This application is a continuation-in-part of a pending U.S. patent application entitled "Method and System For Attracting Visits to Web Sites" filed by inventor Gavin S. H. Cheng on Mar. 3, 2000 having a Ser. No. 09/518,552, which is assigned to the same assignee as the present application and is hereby incorporated by reference.

BACKGROUND OF THE INVENTION

1. Field of the Invention

The present invention is related to the area of Internet browser applications and more particularly related to a method and system for auto-navigation in a three-dimensional browsing environment.

2. Description of the Related Art

In the field of Internet browsing, the popularity of web sites may vary significantly. Most web sites employ various means to increase their number of visits (hits). By increasing their number of visits, the web sites are able to potentially charge higher rates for posting advertisements on their web sites. In addition, if a web site is offering products for sell, a more popular web site is likely to be able to sell more products.

Nevertheless, becoming a popular web site is difficult. Attracting first time visitors presents the challenge of initially informing the potential visitors of the web site's presence. Prior techniques for attracting visits to web sites include simply presenting advertisements for a web site on television or on the radio or in magazines/newspapers. However, advertising a web site through the media may not be effective because the potential web visitor may not remember to visit the advertised web site the next time they are browsing the Internet. Alternatively, the potential web visitor may not remember the address of the advertised web site the next time they are browsing the Internet.

As a result, there is a need for an improved technique of attracting visits to web sites by presenting links to the web sites to be visited at a more effective time and place, which is more likely to produce increased visits to a web site. In addition, there is a further need to present the links of the web sites to be visited in fashion that is more likely to appeal to the curiosity of the potential web site visitors, in order to potentially increase the likelihood of a visit to the web site.

Furthermore, within a 3D environment, navigation may be achieved by moving around the environment. However, this navigation is often crude, requiring that the user indicate which direction to go and for how long (or continue indicating which direction to move) to get to a desired destination. Scrolling through the environment tends to be tedious, and mastering the controls used to indicate motion or otherwise controlling the environment may be difficult. Therefore, providing assistance for efficient navigation may be valuable.

SUMMARY OF THE INVENTION

A method for use in a three dimensional web browsing environment is described. The method, in one embodiment, includes receiving a jump request from one viewing point to another. The method also includes determining a destination from the current viewing point with respect to the jump request. The method further includes calculating a trajectory to the destination from the current viewing point. The method also includes displaying a set of views in animation form along the trajectory and displaying a view corresponding to the destination.

BRIEF DESCRIPTION OF THE DRAWINGS

The present invention is illustrated by way of example and not limitation in the accompanying figures.

The present invention will be readily understood by the following detailed description in conjunction with the accompanying drawings, wherein like reference numerals designate like structural elements.

FIG. 4 illustrates the accumulation of hits/visits for a plurality of web sites.

DETAILED DESCRIPTION

A method and apparatus for navigating directly from one view to another view in a three-dimensional viewing environment is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description of the present invention is presented largely in terms of procedures, steps, logic blocks, processing, and other symbolic representations that directly or indirectly resemble the operations of data processing devices coupled to networks. These process descriptions and representations are typically used by those experienced or skilled in the art to most effectively convey the substance of their work to others skilled in the art.

The method along with the system to be described in detail below is a self-consistent sequence of processes leading to one or more desired results. It proves convenient at times, principally for reasons of common usage, to refer to data as messages, requests, values, elements, symbols, terms, numbers, or the like. It should be borne in mind that all of these similar terms are to be associated with the appropriate physical quantities and are merely convenient labels applied to these quantities.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. For example, in one embodiment, the invention is a 3D web-browsing environment, utilizing content received over the world wide web, but not all embodiments are thus restricted.

Figure 1:
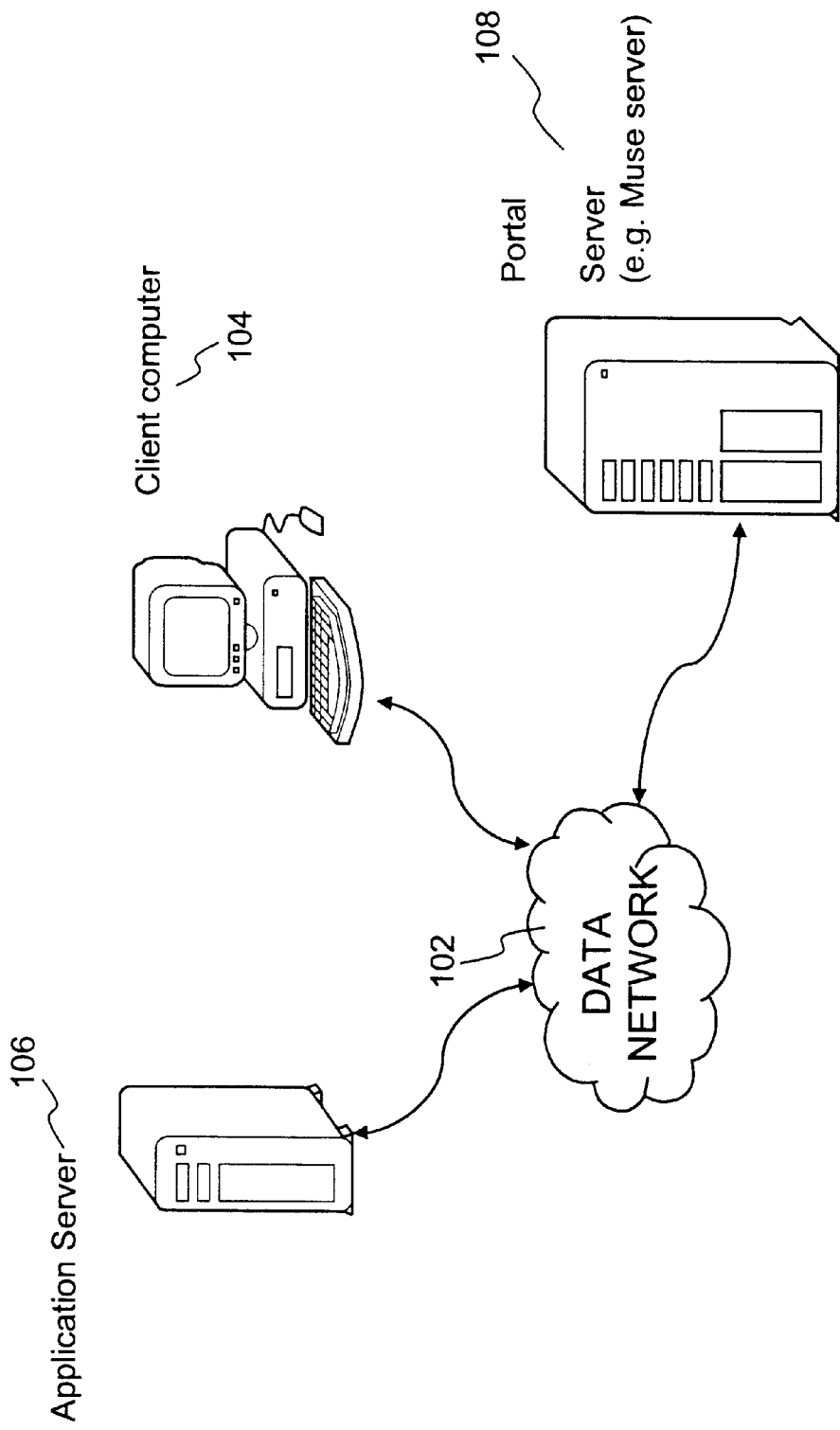
FIG. 1 shows a schematic configuration in which the present invention may be practiced.

Referring now to the drawings, in which like numerals refer to like parts throughout the several views. FIG. 1 shows a system configuration 100 in which one embodiment may be practiced. Data network 102 is a landline network that may be the Internet, the Intranet and a data network of other private and public networks.

Coupled to network 100 are a client computer 104, an application server 104 and a portal server 108. Client computer 104 representing one of numerous devices coupled to network 102 may include, but not be limited to, a personal computer and a wireless mobile device. Typically, client computer 104 is operated by a user who desires to communicate with other devices over network 102.

According to one embodiment, client computer 104 is loaded with an application or program that is herein referred to as a 3D viewing environment module or simply 3D browser. The detailed description of the 3D browser is provided in the reference Ser. No. 09/375,476. When the program is executed in a processor of client computer 104, the 3D browser provides an interactive 3D viewing environment or a 3D overlay for the user to browse various resources in network 100.

Figure 2A:
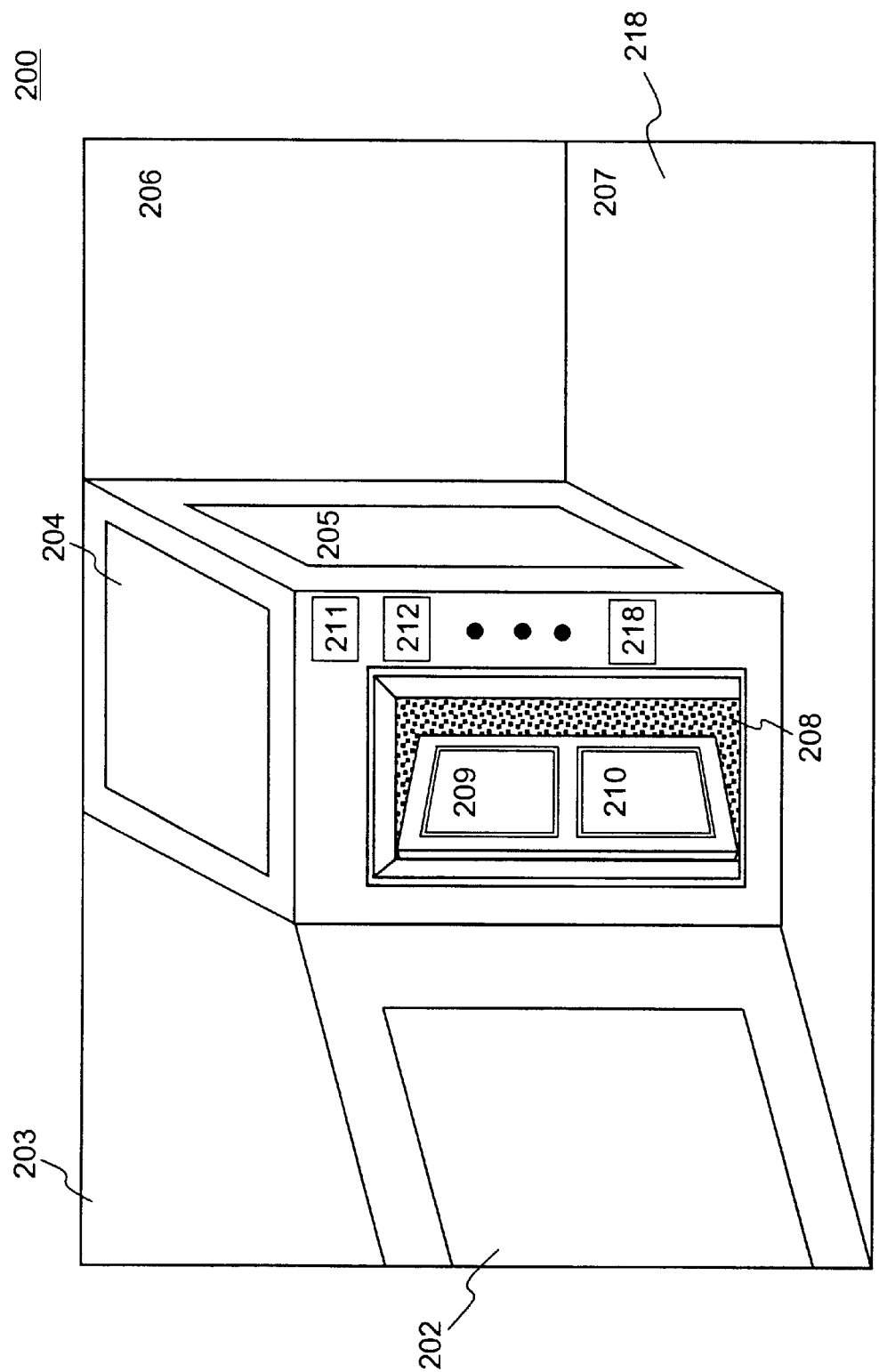
FIG. 2A shows an exemplary 3D viewing environment that may be used to practice present invention.

Referring now to FIG. 2A, there is shown an exemplary 3D viewing environment 200 displayed by a 3D browser. Walls or display areas 202–210 are applicable for respectively displaying network resources. Specifically, each of the walls may be perceived as an independently operable conventional web browser, such as Netscape Communicator and Internet Explorer.

As used herein, a display, a screen display, a displayed web page, or a displayed window is an image presented on a display screen which is a physical display apparatus in a device, such as a CRT or LCD monitor commonly seen with a personal computer. For example, a file that constitutes a display may be an HTML file. An image or a display thereof appears on a display screen when the file is read by a browser.

In addition to the walls 202–210, there are various applications 211–213 in 3D viewing environment 200. These applications may include, but not be limited to, email, alert, and chat, preferably represented as a 3D icon that could be changed from different viewing angles as a user navigates in 3D viewing environment 200.

Figure 2B:
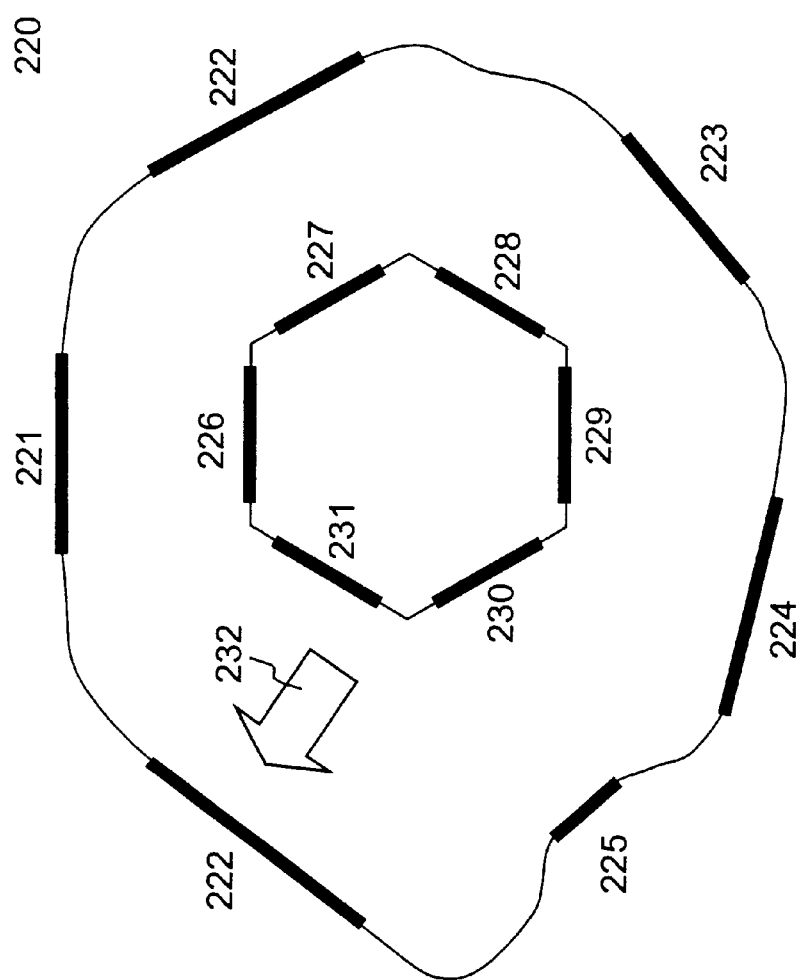
FIG. 2B shows a top view of a 3D viewing environment including a plurality of walls or display areas.

FIG. 2B illustrates a top view of a 3D viewing environment 220 that includes walls 222–231. In one embodiment, a user is graphically situated at 232 looking at wall 222 and can at any time move to any other wall or walls as desired. One of the advantages provided by a 3D viewing environment is to permit a user to navigate therein from one wall to another, just like walking in a museum or shopping wall setting.

Figure 2C:
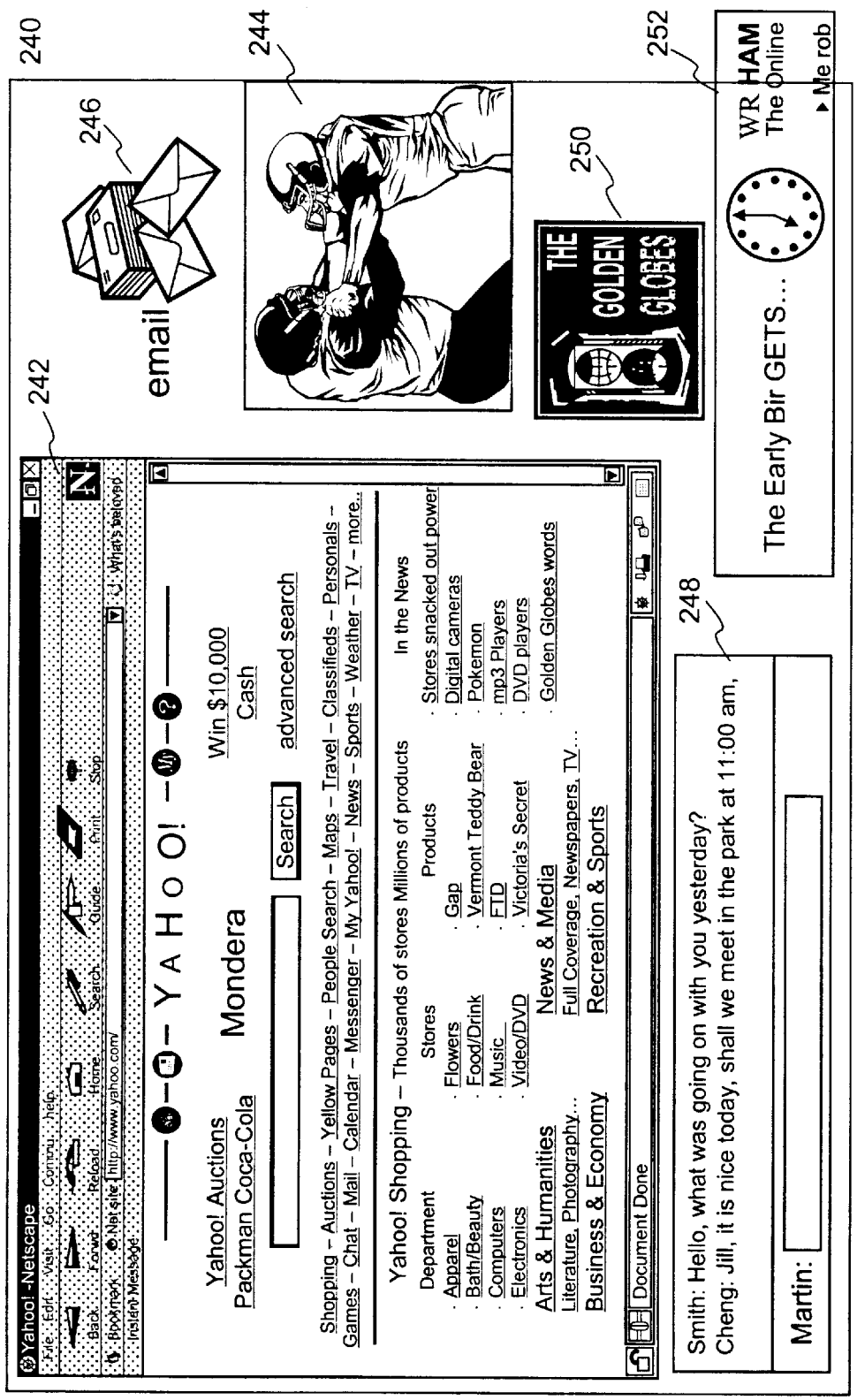
FIG. 2C shows an example of a perspective in a 3D viewing environment that includes a conventional web display, a stream video, an email icon, a chat bar, and advertisement contexts and, each can function independently.

FIG. 2C shows an example of a perspective 240 in a 3D viewing environment that includes a conventional web display 242, a stream video 244, an email icon 246, a chat bar 248, and advertisement contexts 250 and 252, each functioning independently. For example, stream video 244 is playing while chat bar 248 is active and email icon 246 receiving mails without obscuring each other. As noted, advertisement contexts 252 is partially shown and may be shown completely when the user navigates/scrolls towards the right of the screen, which may cause display 242 and chat bar 248 to become partially shown at left.

Referring now back to FIG. 1, application server 106 is one of many servers on network 100 that supports one or more web sites and provides interactive resources to be displayed at the client computer (e.g., the 3D viewing environment of FIGS. 2A–2C). Consider the example of the application server 106 supporting a web site for a shopping mall. Rather than showing a number of static hyperlinks or icons, each representing a store in the mall as typically seen from the conventional web browser, the shopping mall is electronically structured for the 3D viewing environment. In such an example, each of the store fronts may be shown as one of the walls or 3D icons that permit users to "walk" in and browse in the store.

Portal server 108, as shown in the data network, may support a web search engine for the client computers, or related portal services, such as, news, white and yellow pages directories, free email, discussion groups, online shopping and other types of links to separate web sites. In one embodiment of the present invention, the portal server 108, provides to the client computers a 3D viewing environment/module interface, as discussed above.

Figure 3:
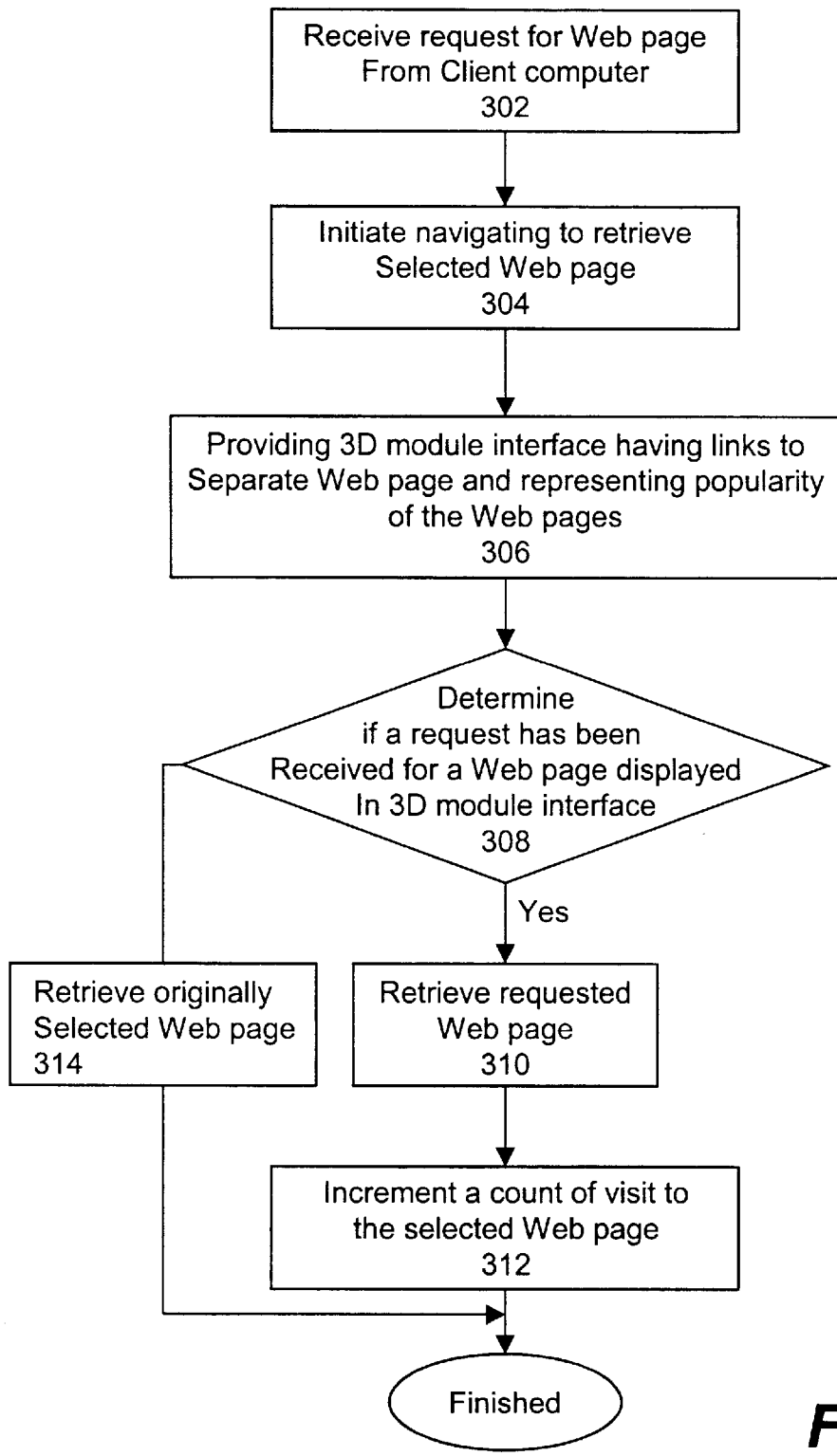
FIG. 3 is a flow diagram describing the steps of attracting visits to web sites in accordance with one embodiment.

FIG. 3 illustrates a flow diagram describing the steps of attracting visits according to one embodiment. It should be noted that the steps in FIG. 3 do not inherently indicate any particular order nor imply any limitations in the present invention. In step 302, a portal server receives an input from a client computer coupled to the portal server via the Internet, or alternatively via an intranet connection.

The input received is interpreted to be a request to interconnect the client computer with a designated web page/web site, typically hosted by a separate application server. The designated web page selected by the client computer may be selected from a list of links displayed via a browser on the client computer, as provided by the portal sever, or may be input by a user at the client computer (e.g., a Universal Resource Locator).

In step 304, in response to the request from the client computer for the selected web page, the portal server initiates navigating to retrieve the selected web page. In one embodiment, in addition to navigating to retrieve the selected web page, in step 306, the portal sever provides to the client computer a 3D module interface that is displayed at the client computer via a 3D browser at the client computer.

More specifically, in one embodiment the portal sever further provides to the client computer a set of links to a plurality of separate Web pages or sites (pages and sites are used interchangeably hereafter). The links are displayed within the 3D module interface, as displayed at the client computer. In one embodiment, the 3D module interface is displayed at the client computer during the time period that elapses while the portal server is retrieving the web page previously selected by the client computer.

In an alternative embodiment, the set of links to the plurality of separate web pages as displayed in the 3D module may be dynamically selected by the portal server each time it retrieves a web page as requested by a user at a client computer. Moreover, the set of links to the plurality of separate web pages may correspond to a subject matter related to the web page requested by a user at the client computer.

In one embodiment, at least some of the plurality of links to separate web pages embedded in the 3D module include a representation of a number of visits to the respective web pages. For example, the representation may be a numerical representation indicating the number of visits to the respective web page within a recent pre-designated period of time (e.g., hour, day, week, month.) Alternatively, the representation of the number of visits may be a rating on a scale (e.g., 1–10). The rating could be a scale relative to other links to web pages as included in the 3D module interface. Further, the representation of the number of visits to a group of web pages may be from a group of paid subscribers to the host of the portal server for showing the popularity of the respective web pages in a hope to further attract more visits thereto.

In one embodiment, the number of visits corresponding to the respective web pages to be represented in the 3D module interface may be accumulated and maintained at the portal server, or alternative at a separate server. For example, as shown in FIG. 4, the number of hits/visits for the respective web sites, as designated by their domain names, may be accumulated and stored on a server every time a request is made to visit a respective web site.

In addition, the representation of the number of visits to the respective web pages may be shown as a graphical representation. The graphical representation could have a graphical correlation to the web page, to which the graphical representation corresponds.

Figure 5:
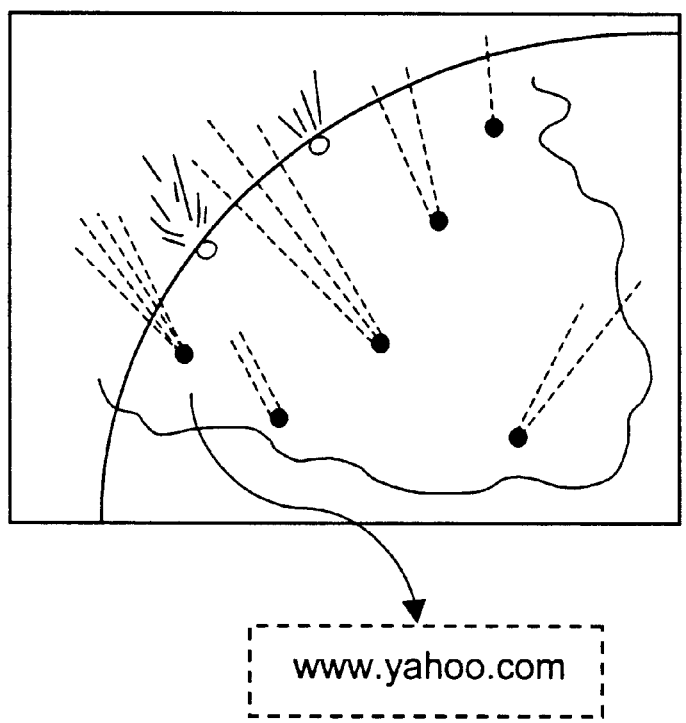
FIG. 5 illustrates an example of a three-dimensional module interface having a set of links to a plurality of web pages/sites, according to one embodiment.

In one embodiment, the 3D module is scrolled across the screen of the client computer (horizontally or vertically), in an evolving manner. For example, the scrolling 3D module may appear on the display of the client computer as a scene in a window from a moving car. In a further example, as illustrated in FIG. 5, the 3D module could represent a revolving globe with respective links to the plurality of web sites provided as dots on continents. Beams could be shown as trickling feeding to the dot/links, the density thereof representing the popularity of the respective sites (i.e., the number of times/frequency that the respective site has been visited). As a result, the popularity representation may attract visits to those dots/links.

In addition, the set of links to the plurality of separate web pages may be posted within the 3D module as a result of paying a fee (e.g., a subscription to the portal server). For example, in one embodiment, the greater the payment to post a link within the 3D module, the earlier within the 3D module interface the respective link may be displayed.

In one embodiment, the duration for displaying the 3D module interface which includes the links to the plurality of web pages could be extended beyond the time period it takes the portal server to retrieve the selected web page. In such an embodiment, the 3D module including the links to the plurality of web pages would continue to be displayed at the client computer for an extended period time in place of the web page previously selected by a user at the client computer.

In step 308, it is determined if a user at the client computer (where the 3D module is displayed) has selected/highlighted a link displayed in the interface. If the user has selected a link in the 3D module interface, in step 310 the portal server initiates navigating to retrieve the selected web page. In one embodiment, the recently selected web page could be retrieved and displayed at the client computer in place of the previously selected web page. Alternatively, the recently selected web page could be retrieved and displayed at the client computer concurrently with the previously selected web page.

In step 312, in further response to a user at the client computer selecting one of the links to the plurality of web pages, the portal server increments a count of visits to the respective web site. In one embodiment, the count can be stored locally at the portal server, or alternatively remotely at a separate server, as previously discussed.

In step 314, if none of the links to the plurality of web pages in the 3D module have been selected while the portal server has navigated to retrieve the previously selected web page, the portal server proceeds to retrieve and display the originally selected web page.

Figure 6:
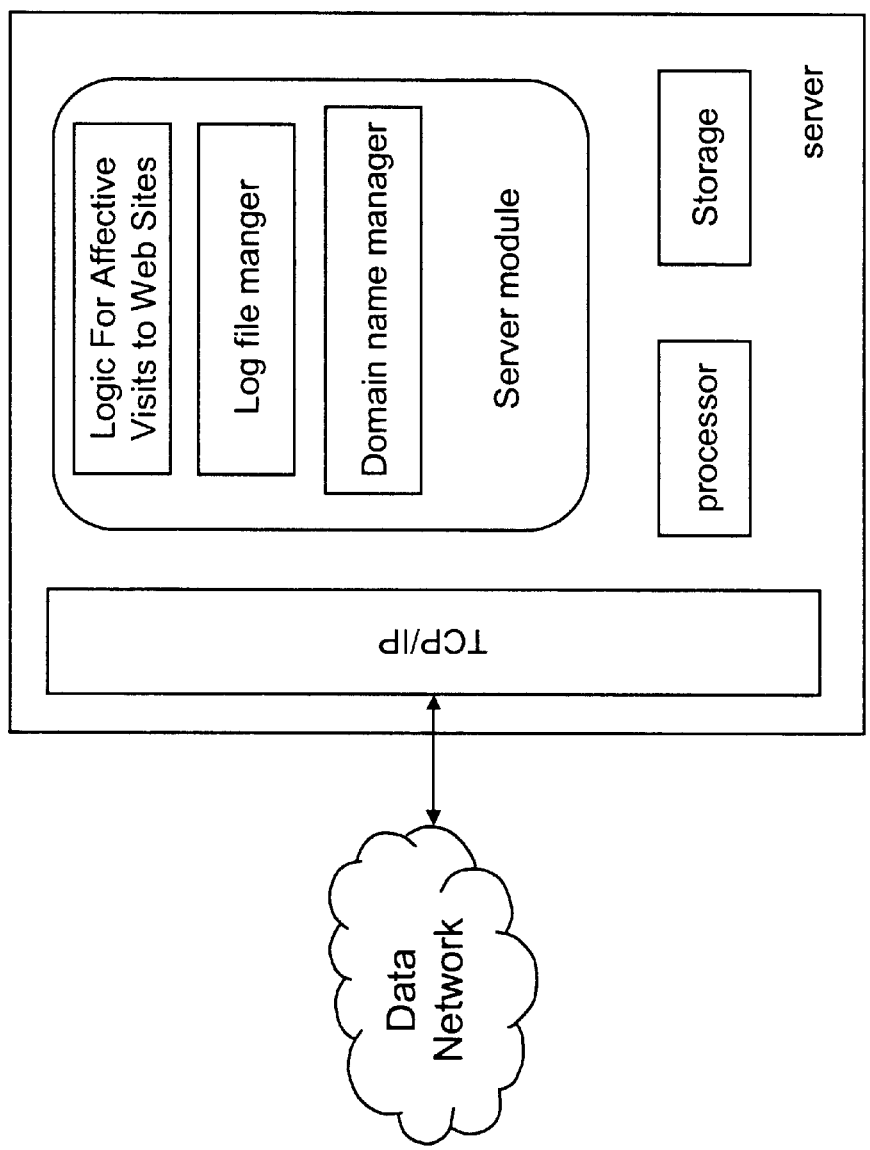
FIG. 6 illustrates an example of a server include a first unit of logic to attract visits to web sites in accordance with one embodiment.

The method for attracting visits to web sites/web pages, as described above, can be stored in memory of the portal server, as a set of instructions to be executed, as shown by way of example in FIG. 6. The server as shown in FIG. 6, includes a server module having a Domain name manager, a log file manager, along with the logic to attract visits to Web sites, as previously mentioned. The domain manager manages a list of domains (names of web sites) along with a number of visits to each of the web sites for a predefined period. Log file manager determines if a request received from the network will cause a new entry to the list in the domain manager and provide necessary statistic data representing the popularity of the sites in the list to a terminal device that sent the request. For example, a request received from a terminal device is for www.xyzcorp.com, log file manager first check with the domain list in the domain manager to see if www.xyzcorp.com is being statistically measured with respect to the number of visits to the site. If it is found that www.xyzcorp.com is not in the list, the name may be added into the list so that the popularity thereof can be measured. If www.xyzcorp.com is in the list, the domain manager may be caused to increment its measurement on the particular site. Alternatively, the log file manager is used to control a list of certain sites, preferably paid for by the respective owner thereof, that the popularity of these sites should be always measured and displayed whenever there is an opportunity to display such information to a terminal device, hence potentially increasing the number of hits to these sites in the paid list. In addition, there are a processor, storage, and a port to interconnect the server with a data network, such as the Internet.

In addition to attracting hits to web sites, other features may be implemented in a three-dimensional viewing environment. For example, animated navigation from one point within the environment to another point within the environment may be achieved. A user may have a perspective or view of the environment displayed (such as a view from a current viewpoint or a current view), and select a destination within that view. Then, an embedded process calculates a trajectory or path to take in moving the view to the chosen destination. The path or trajectory may be followed by presenting to the user an animated sequence of images or views representing the intermediate views encountered by the user in moving from the original point in the environment to the selected destination.

Figure 7:
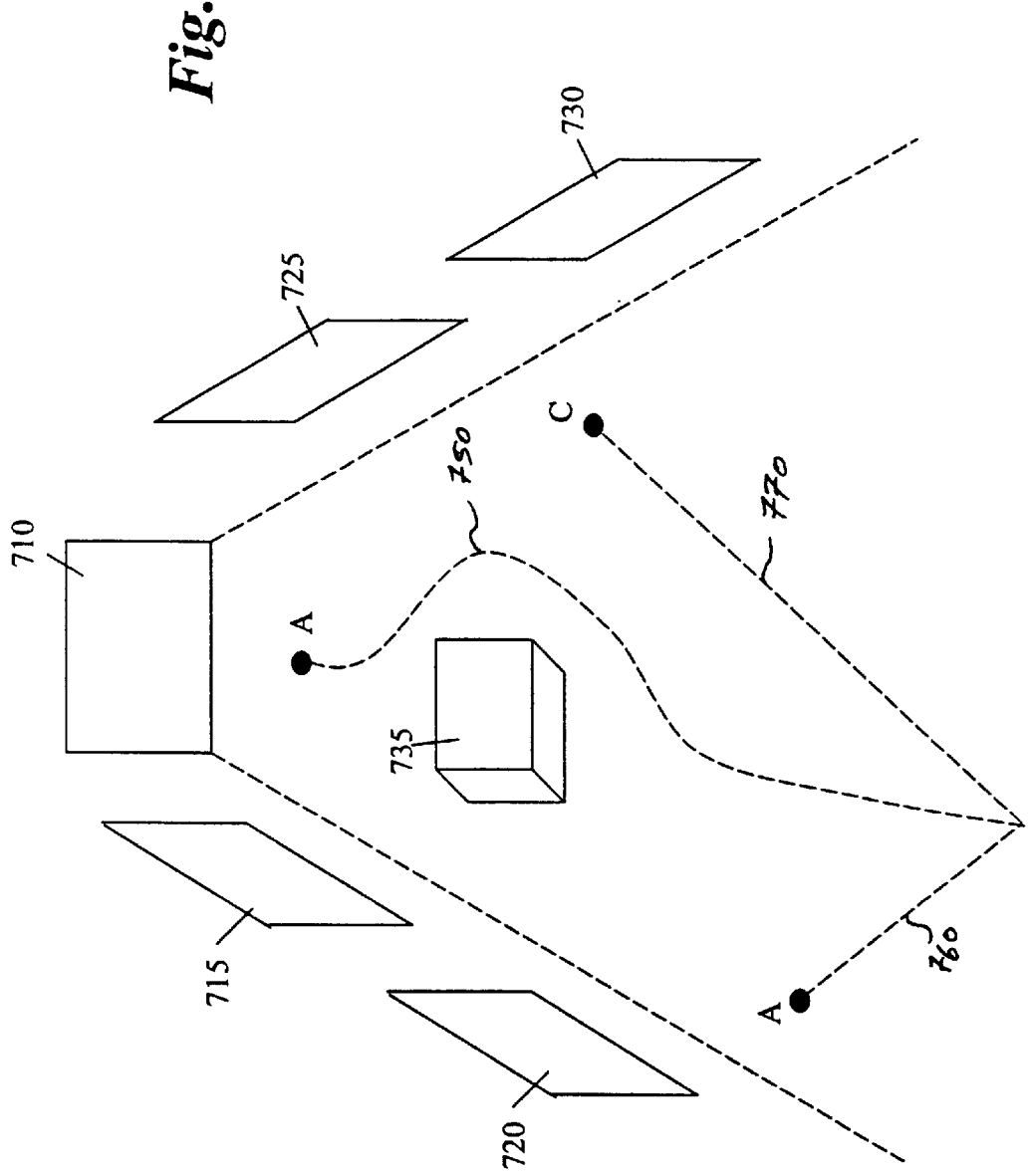
FIG. 7 illustrates an alternate embodiment of a three-dimensional browsing environment.

Turning to FIG. 7, a view of a 3D web browsing or viewing environment is illustrated. Windows 710, 715, 720, 725 and 730 all represent display walls as may be observed by a user. Each may be an independent browser window or display wall. Location A represents a virtual point within the environment which is directly in front of window 710. Similarly, location B represents a virtual point within the environment which is directly in front of window 720 and location C represents a virtual point within the environment which is directly in front of window 725. Object 735 illustrates a virtual block in the environment which may have a web browser window on each exposed face or a 3D icon (note that the block need not be resting on the surface).

In one embodiment, the user may choose to navigate to a particular spot by selecting that spot, such as by pointing and clicking the spot with a cursor control device for example. In an alternate embodiment, pointing and clicking on a window causes the user to be transported to a corresponding spot in front of the window, such as location A for window 710 for example. In either embodiment, it will be appreciated that navigation around an intermediate obstacle such as block 735 may be desirable. Thus, path 750 may represent a trajectory from the current position of the user to location A, path 760 may represent a trajectory leading to location B and path 770 may represent a trajectory leading to location C.

Figure 8:
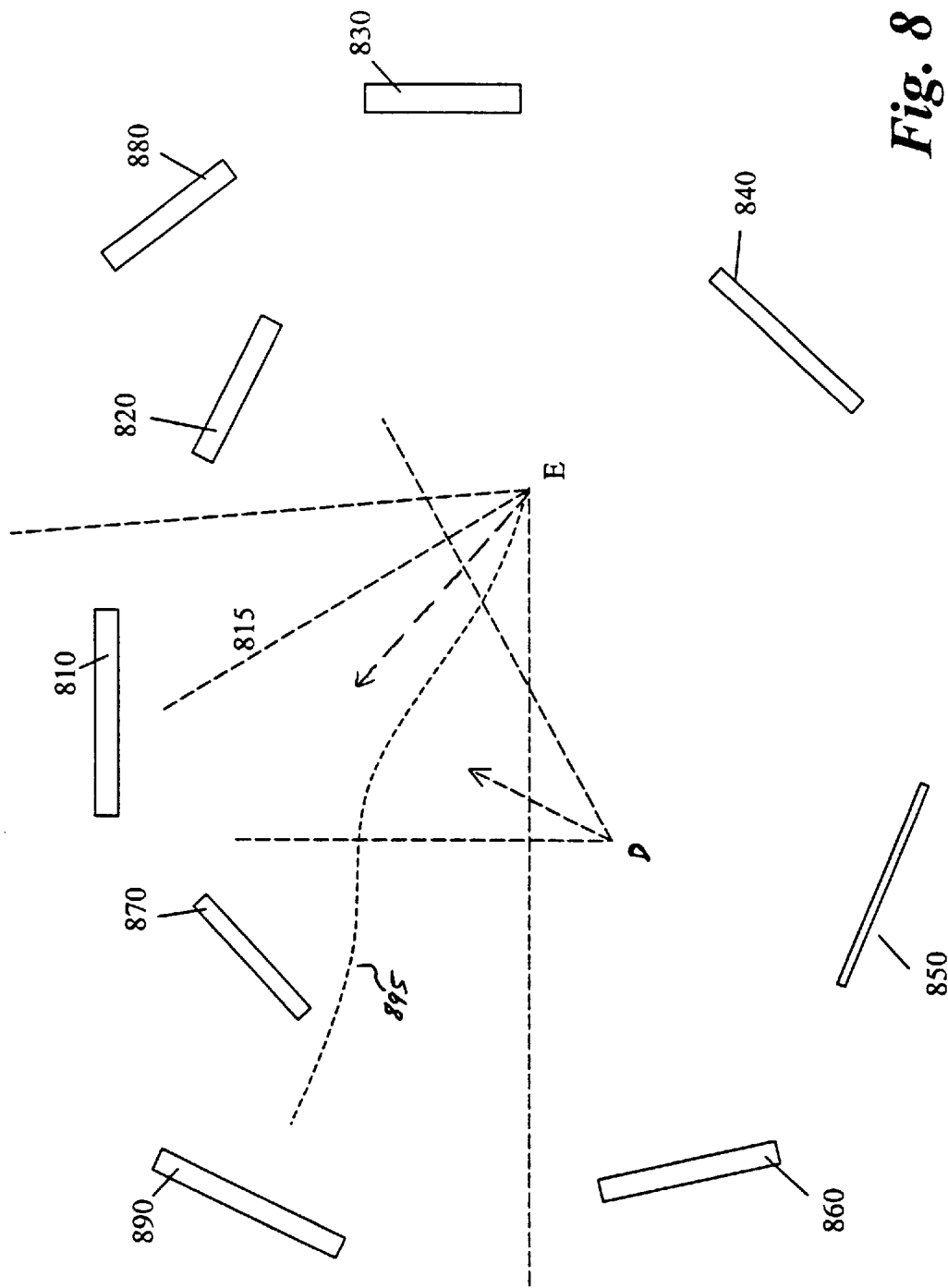
FIG. 8 illustrates another alternate embodiment of a three-dimensional browsing environment.

Turning to FIG. 8, a view of an alternate 3D web browsing environment is illustrated. Points D and E are virtual points within the environment, indicating two places where a user may be perceived as standing. For each, an arrow is added indicating a direction a user may perceive as straight-ahead from such a point and two boundary lines are added which represent the dividing line between what is presented to the user and what is not shown. It will be appreciated that the points, directions, and boundaries illustrated were chosen for purposes of illustration, and not due to a limitation on the capabilities of a 3D browsing environment.

Each of objects 810, 820, 830, 840, 850, 860, 870, 880, and 890 represent web browser windows or display walls within the environment as previously described with respect to objects such as window 710. In this illustration, two paths are shown, path 815 and path 895. Path 815 illustrates the perceived path a user would take from point E to browsing window 810. As there are no obstacles to this path, a straight-line path may be sufficient, though it need not be the path actually shown. Path 895 includes a jog sufficient to present to a user an indication that the user moves around browser window 870 to get to browser window 890. Motion along these paths or trajectories may be presented in an animation form, as an apparently animated sequence of images.

Figure 9:
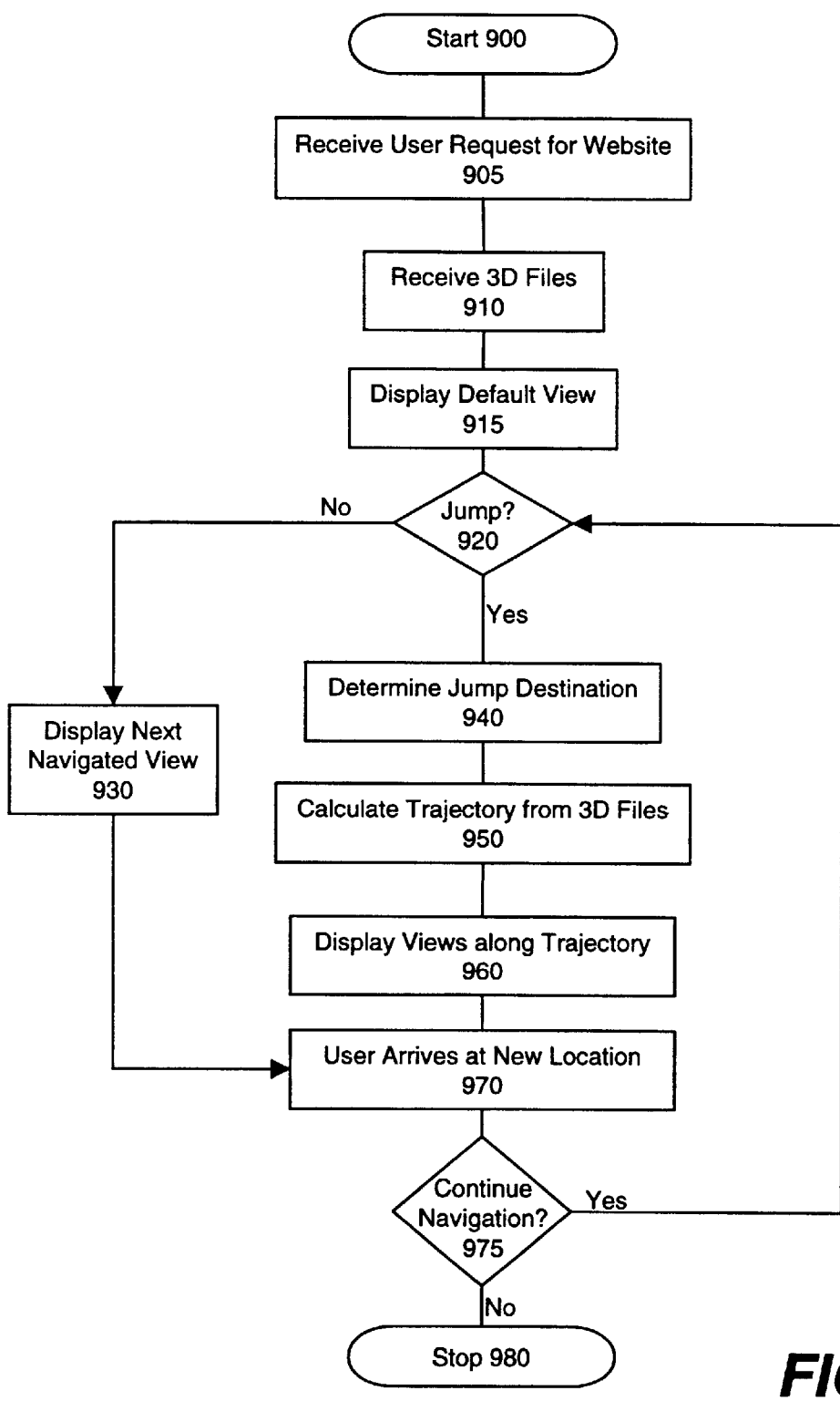
FIG. 9 illustrates an embodiment of a method of auto-navigating within a 3D browsing environment.

Turning to FIG. 9, a block diagram of one embodiment of a process of auto-navigating in a 3D browsing environment is illustrated. The process starts with start block 900. At block 905, a user request for a website is received. At block 910, 3D files for the requested website are received by a computer operated by the user. At block 915, a default view of a website is displayed in 3D form. At block 920, a determination is made as to whether the user has requested a jump, such as moving directly from a virtual point to another virtual point. If no jump was requested, at block 930 the next navigated view is displayed, as the user may move incrementally forward, backward, or may rotate, among other motions. The user then appears to arrive at a new location (or a new perspective if rotating) at block 970.

If a jump was requested, at block 940, the jump destination is determined, such as determining what virtual point corresponds to the portion of the screen on which the user clicked for example. At block 950, a trajectory or path from the current user position to the destination is calculated. At block 960, the views along the trajectory or path are displayed in an animation form, providing to the user the perception of traveling through the 3D browsing environment to the destination. Then, at block 970, as described above, the user arrives at the destination and the view at the destination point is displayed.

At block 975, a determination is made as to whether navigation should be continued or not. If it should not, the process terminates at block 980, if it should, the process moves to block 920 for another determination of whether a jump was requested.

Details of various embodiments may serve to further illustrate the invention. For example, the 3D files received at block 910 include, in one embodiment, a set of files corresponding to a set of virtual points within a 3D web-browsing environment. Each file of the set of files contains information suitable for presenting the view of the website from the corresponding virtual point in any direction in which something may be perceived. Furthermore, these files contain information about the locations of objects which may be perceived in the website.

With respect to calculating the trajectory to a destination, in one embodiment, this is accomplished by first calculating a straight-line path to the destination, determining what obstacles need to be avoided, and then calculating a path around the obstacles. In an alternate embodiment, a straight-line path toward the destination is calculated until it intercepts an obstacle, at which time the path is deviated around the obstacle until a clear path to the destination is achieved.

As regards displaying views along the trajectory, in one embodiment, views which correspond to virtual points between points of the set of points provided (the provided virtual points) with the set of 3D files may be interpolated, using information from the set of 3D files. Similarly, the destination may be restricted to a provided virtual point in one embodiment, or it may be a virtual point for which a view is calculated based on the provided virtual points and corresponding views.

Moreover, in one embodiment, the animation of the views may be adjusted to provide finer or coarser granularity, and higher or lower speed of changing views, thus resulting in smoother or rougher and faster or slower perception of motion by the user.

The method for auto-navigating in a 3D web browsing environment, as described above, can be stored in memory of the portal server, as a set of instructions to be executed. In addition, the instructions to perform the methods as described above could alternatively be stored on other forms of machine-readable media, including magnetic and optical disks and carrier waves.

Alternatively, the logic to perform the methods as discussed above, could be implemented in additional computer and/or machine readable mediums, such as firmware/software accessible from electrically erasable programmable read-only memory (EEPROM's), RAM, or ROM; or accessible from electrical, optical, acoustical or other forms of propagated signals (e.g., carrier waves, infrared signals, digital signals, etc.); etc. Moreover, the functions performed in the different blocks of the method may be implemented by discrete hardware components such as large-scale integrated circuits (LSI's), application-specific integrated circuits (ASIC's), or other integrated or discrete programmable or dedicated logic units and sub-units.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. Moreover, the blocks of FIG. 9 represent portions of a method which, in some embodiments, may be reordered or may be organized in parallel rather than in a linear or step-wise fashion. The present specification and figures are accordingly to be regarded as illustrative rather than restrictive.

What is claimed is:

1. In a three dimensional browsing environment having a plurality of view points, each view point representing a virtual position from which a user can navigate to view at least one of displays structured in a 3D fashion in the three dimensional browsing environment, a method comprising:

receiving a jump request from a first view point in the three dimensional web browsing environment to a second view point in the three dimensional web browsing environment;

determining a destination corresponding to the second view point;

calculating a trajectory to avoid obstacles in moving from the first view point to the destination;

displaying a set of views in animation form along the trajectory; and displaying a view corresponding to the destination.

2. The method of claim 1 further comprising:

displaying a default view including the first view point and the second view point.

3. The method of claim 2 further comprising:

receiving a set of 3D web-browsing files of a website, at least some of the files representing one of the displays to be viewed at the second view point.

4. The method of claim 3 further comprising:

receiving a user request for the website.

5. The method of claim 1 wherein:

the calculating of the trajectory includes:
calculating a straight-line path;
finding the obstacles in the straight-line path; and
calculating deviations to the straight-line path to avoid obstacles.

6. The method of claim 1 wherein:

the calculating of the trajectory includes:
following a straight-line path toward the destination until an obstacle is found or the destination is reached; and
deviating the straight-line path around the obstacle until a straight-line path to the destination is available.

7. A system for facilitating navigation in a three dimensional browsing environment having a plurality of view points, each view point representing a virtual position from which a user can navigate to view at least one of displays structured in a 3D fashion in the three dimensional browsing environment, the system comprising:

a first logic unit configured to receive a jump request;

a second logic unit configured to determine a destination of the jump request;

a third logic unit configured to calculate a trajectory to avoid obstacles in moving to the destination;

a fourth logic unit configured to display a set of views in animation form along the trajectory; and a fifth logic unit configured to display a view corresponding to the destination.

8. The system of claim 7, further comprising:

a sixth logic unit configured to receive a user request for the website;

a seventh logic unit configured to receive a set of 3D web-browsing files of a website representing one of the displays corresponding to the destination; and an eighth logic unit configured to display a default view.

9. The system of claim 8, wherein the third logic unit includes:
a first logic sub-unit configured to calculate a straight-line path;
a second logic sub-unit configured to find obstacles in the straight-line path; and
a third logic sub-unit configured to calculate deviations to the straight-line path to avoid obstacles.

10. The system of claim 8, wherein the third logic unit includes:
a first logic sub-unit configured to follow a straight-line path toward the destination until an obstacle is found or the destination is reached; and
a second logic sub-unit configured to deviate the straight-line path around the obstacle until a straight-line path to the destination is available.

11. A machine readable medium embodying instructions for execution by a processor, which, when executed by a processor, cause the processor to facilitate navigation within a three dimensional browsing environment having a plurality of view points, each view point representing a virtual position from which a user can navigate to view at least one of displays structured in a 3D fashion in the three dimensional browsing environment, the system, the machine readable medium comprising:

program code for receiving a jump request from a first view point in the three dimensional web browsing environment to a second view point in the three dimensional web browsing environment;

program code for determining a destination corresponding to the second view;

program code for calculating a trajectory to avoid obstacles in moving from the first view to the destination;

program code for displaying a set of views in animation form along the trajectory; and program code for displaying a view corresponding to the destination.

12. The machine readable medium of claim 11 further comprising:

program code for receiving a user request for the website;

program code for receiving a set of 3D web-browsing files of a website, the set of views and the view corresponding to the destination determined from the files; and program code for displaying a default view.

13. The machine readable medium of claim 12 further comprising:

program code for calculating the trajectory includes:
program code for calculating a straight-line path;
program code for finding the obstacles in the straight-line path; and
program code for calculating deviations to the straight-line path to avoid obstacles.

14. The machine readable medium of claim 12 further comprising:

program code for calculating the trajectory includes:
program code for following a straight-line path toward the destination until an obstacle is found or the destination is reached; and
program code for deviating the straight-line path around the obstacle until a straight-line path to the destination is available.

* * * * *